June 7, 1932.                J. A. HOUCK, SR                 1,862,016
AUTOMOBILE GASOLINE TANK BAFFLE
Filed June 1, 1931
Fig.1
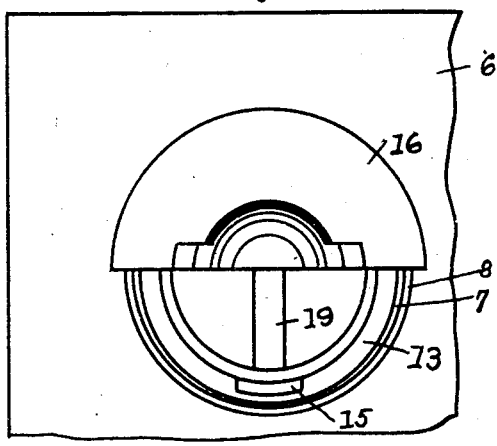
Fig.3
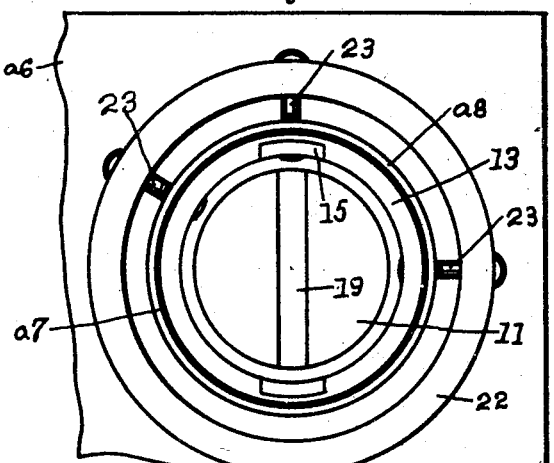
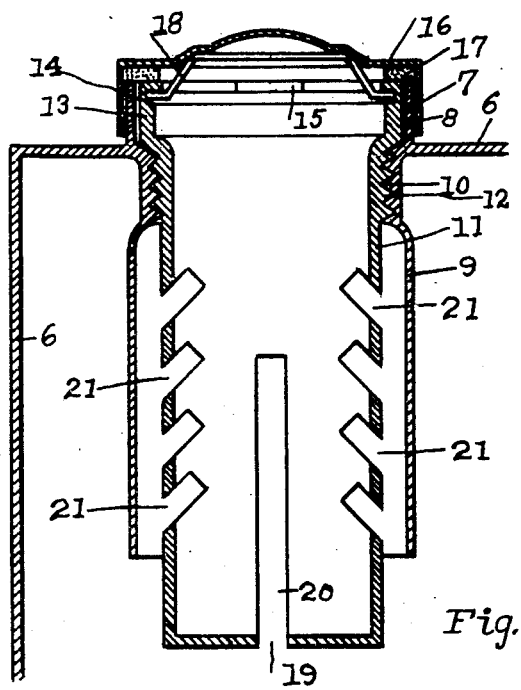
Fig.2
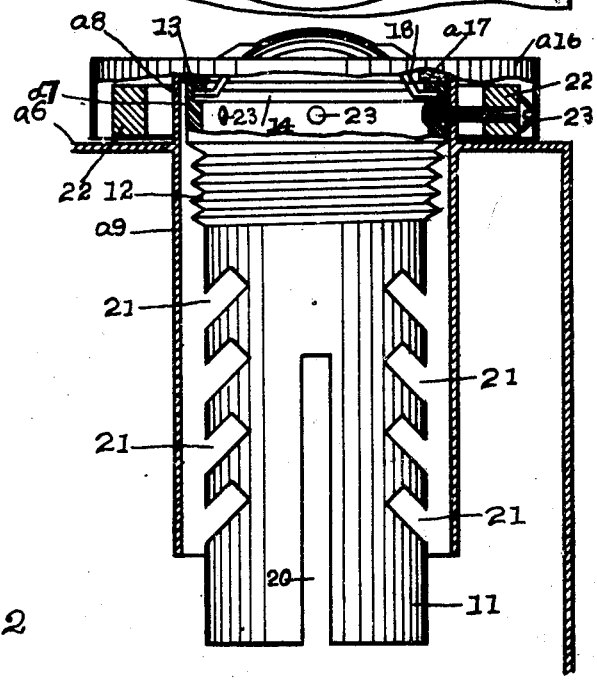
Fig.4
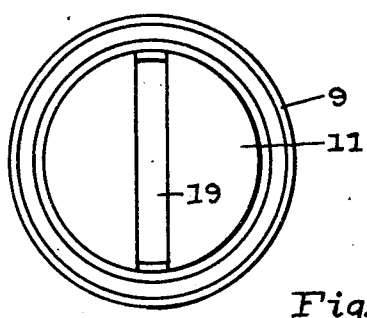
Fig.5
INVENTOR,
John A. Houck, Sr.
BY David E. Lain
ATTORNEY.

Patented June 7, 1932

1,862,016

UNITED STATES PATENT OFFICE

JOHN A. HOUCK, SR., OF BELLINGHAM, WASHINGTON

AUTOMOBILE GASOLINE TANK BAFFLE

Application filed June 1, 1931. Serial No. 541,291.

My invention relates to improvements in automobile gasoline tank baffles, and has for an object to provide a baffle for fastening within the inlet opening to the gasoline tank of automobiles making inserting hose into the tank through said opening difficult to syphon off the contents thereof while allowing the ready flow of gasoline through said opening into the tank and inserting the usual stick therein to measure the contents thereof.

Another object of my improvement is to provide said baffle suitable for attaching to automobile gasoline tanks as an accessory thereof.

Other objects of my improvement will appear as the description proceeds.

I attain these and other objects of my improvement with the device illustrated in the accompanying sheet of drawing, forming a part of this specification, in which Figure 1 is a plan view of an automobile gasoline tank showing the corner thereof containing the gasoline inlet opening thereinto, the remainder of the tank being broken away for lack of space and one half of the inlet cap being broken away, Fig. 2 is a side elevation of Fig. 1 in section on a medial vertical plane, Fig. 3 is a plan view of another automobile gasoline tank showing the corner thereof containing the gasoline inlet opening thereinto, the remainder of the tank being broken away for lack of space and the cap covering said inlet opening being omitted, Fig. 4 is a side elevation of Fig. 3 partly in section on a medial vertical plane, and Fig. 5 is a bottom plan view of Fig. 2, serving also as a bottom plan view of Fig. 4.

Similar characters refer to similar parts throughout. Certain parts are broken away to show other parts hidden thereby.

With more particular reference to the designated parts: Gasoline tank 6 has inlet-opening casing 9 fastened in the top thereof providing inlet opening 7 with outside end 8 of said casing. Interior screw threads 10 are provided near the upper end of the casing at a part of reduced diameter thereof. Baffle 11, preferably, in general, cylindrical in shape has side and bottom walls and an open top, with an exterior thread 12 thereon for engagement with said thread 10 with which, preferably, it makes a close fit. The upper end 13 of the baffle, preferably, is of enlarged diameter and is provided with interior annular groove 14 to engage spring clip 18 which is extended thereinto through notches 15, 15 in the top edge of end 13 of the baffle.

Cap 16 fits over outside casing end 8, is fastened to spring clip 18 which, when engaged in groove 14, firmly holds the cap in place over the upper end 13 of the baffle with gasket 17 intervening.

Diametrical slot 19 is made across the bottom wall of the baffle and is continued upward in side walls 9 thereof at 20, 20 at both ends thereof. Slot openings 21, 21, etc., are made in the side walls of the baffle and, preferably, slant outward and downward diagonally as shown.

In practice: To remove cap 16 it is pressed downward and revolved to cause the ends of spring clip 18 to enter notches 15 when it may be taken off. For filling the tank the usual gasoline hose nozzle is extended into the top open end 13 of the baffle and gasoline therefrom may enter the tank through slot openings 19, 20 and 21, 21, etc. Gasoline pouring through openings 21 will strike casing 9 and is aided in freely moving downward into the tank by the illustrated oblique disposition of said openings.

Slot 19 provides for extending the usual measuring stick therethrough into the tank. A hose suitable for withdrawing gasoline from the tank by siphoning the same off is too large for extending through any of the disclosed openings in the baffle walls and, therefore, could not be passed into the tank to contact with the gasoline therein. Therefore, my baffle discourages attempts to steal gasoline from a tank equipped therewith and provides real protection against said theft.

Figs. 3 and 4 show a simple means of fastening my baffle in tank $a6$ having filling opening $a7$ and casing $a8$, $a9$ fastened therein. A baffle similar to that illustrated in Figs. 1, 2 and 3 may be used but thread 12 thereon is not required in the installation. The baffle is extended in casing $a8$, $a9$ with its top end flush with the top end of casing a8. Ring 22 is disposed around casing a8 and has at least three openings radially therethrough and openings in line therewith are made in casing a8 and the top end 13 of the baffle, the openings in the latter being tapped. Screws 23, 23, 23 are extended through said openings in the ring and casing and engaged in the tapped openings in the baffle. Preferably, the inner ends of the screws where protruding are upset to make withdrawal thereof difficult.

The disclosed way of fastening ring 22, casing a8 and the top end 13 of the baffle together to retain said baffle in place serves the purpose very well and provides a convenient method of attaching my protecting baffle to the tanks of a number of makes of cars without removing any of the usual fixtures thereto. The apparently irregular spacing of screws 23 is often made necessary by the presence of other features adjacent the tank inlet.

Cap a16 is made large to also cover ring 22 and is retained by spring clip 18 engaging in groove 14 as in Fig. 2 having gasket a17 between the cap and the top edge of the baffle.

Although but two particular ways of fastening my baffle within a tank inlet opening are shown above it is apparent that it is well suited for installing in many of the usual shapes of tank inlets by slight variations thereof which have no great bearing on the central idea of this invention. Also, when installed at the time of making the tank, the particular shape suitable for fastening the same in the tank is much simplified.

Having thus disclosed my invention, what I claim as new therein and desire to secure by Letters Patent is:—

In a tank inlet baffle, an open-top hollow body having perforated side and bottom walls disposable within the inlet casing of an automobile gasoline tank, a ring having radial openings therethrough disposed around the outer ends of said inlet casing and baffle with said radial holes aligned with holes through said casing and tapped holes through said baffle, screws extended through said holes in said ring and casing and engaged in said tapped baffle holes, and a cap fitting over said open top of the baffle engaged therewith.

JOHN A. HOUCK, Sr.